United States Patent
Diels et al.

(10) Patent No.: US 10,317,212 B1
(45) Date of Patent: Jun. 11, 2019

(54) ENHANCEMENT OF THE PHASE RESPONSE OF INTRACAVITY PHASE INTERFEROMETERS

(71) Applicant: STC.UNM, Albuquerque, NM (US)

(72) Inventors: Jean-Claude Diels, Albuquerque, NM (US); Ladan Arissian, Albuquerque, NM (US); Matthias Lenzner, Tucson, AZ (US); James Hendrie, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 15/984,048

(22) Filed: May 18, 2018

Related U.S. Application Data

(60) Provisional application No. 62/508,648, filed on May 19, 2017.

(51) Int. Cl.
*G01C 19/66* (2006.01)
*G01C 19/70* (2006.01)

(52) U.S. Cl.
CPC ........... *G01C 19/662* (2013.01); *G01C 19/70* (2013.01)

(58) Field of Classification Search
CPC ...... G01C 19/00; G01C 19/66; G01C 19/661; G01C 19/72; G01C 19/721; H01S 3/00; H01S 3/05; H01S 3/06; H01S 5/00; H01S 5/065
See application file for complete search history.

(56) References Cited

U.S. PATENT DOCUMENTS

| | | | |
|---|---|---|---|
| 5,251,230 A | 10/1993 | Lai et al. | |
| 5,367,528 A | 11/1994 | Diels et al. | |
| 6,650,682 B1 | 11/2003 | Diels et al. | |
| 8,929,405 B2 | 1/2015 | Ruffini et al. | |
| 9,726,472 B1 | 8/2017 | Diels et al. | |
| 9,859,677 B1* | 1/2018 | Arissian ................. | G01N 21/41 |
| 2004/0213302 A1* | 10/2004 | Fermann ............... | H01S 3/0057 372/6 |

OTHER PUBLICATIONS

Arnold Sommerfeld.U" ber die Fortpflanzung des Lichtes in dis-perdierenden Medien. Ann. Phys., 44:177-202, 1914.
M. G. Sagnac. L'ether lumineux d'emontr'e par l'effet du vent relatif d'ether dans un interf' erom' etre en rotation uniforme. Comptes Rendus, 157:708-710, 1913.
E. J. Post. Sagnac effect. Rev. Mod. Phys., 39:475-493, 1967.
F. Aronowitz. The laser gyro. In Ross, editor, Laser Applications, pp. 133-200. Academic Press, New York, 1971.
M. L. Dennis, J.-C. Diels, and M. Lai. The femtosecond ring dye laser: a potential new laser gyro. Optics Letters, 16:529-531, 1991.
L. Arissian and J.-C. Diels. Intracavity phase interferometry: frequency comb sensors inside a laser cavity. Laser Photonics Rev, 8:799-826, 2014.
Ming Lai, Jean-Claude Diels, and Michael Dennis. Nonreciprocal mea-surements in fs ring lasers. Optics Letters, 17:1535-1537, 1992.

(Continued)

*Primary Examiner* — Jonathan M Hansen
(74) *Attorney, Agent, or Firm* — Vogt IP; Keith A. Vogt

(57) ABSTRACT

Apparatus, systems, and methods associated with enhancement of phase response of intracavity phase interferometers are applicable in a variety of applications.

19 Claims, 10 Drawing Sheets

(56) References Cited

OTHER PUBLICATIONS

Sylvain Schwartz, Fabienne Goldfarb, and Fabien Bretenaker. Some considerations on slow- and fast-light gyros. Optical engineering, 53:102706-1-102706-4, 2014.

Scott Diddams, Jean-Claude Diels, and Briggs Atherton. Differential intracavity phase spectroscopy of a three-level system in samarium. Phys. Rev. A, 58:2252-2263, 1998.

Koji Masuda, James Hendrie, Jean-Claude Diels, and Ladan Arissian. Envelope, group and phase velocities in a nested frequency comb. Jour-nal of Physics B, 49:085402, 2016.

Tianliang Qu, Kaiyong Yang, Xiang Han, Suyong Wu, Yun Huang, and Hui Luo. Design of a superluminal ring laser gyroscope using multilayer optical coatings with huge group delay. Nature Communications, 2014.

H. N. Yum, M. Salit, J. Yablon, K. Salit, Y. Wang, and M. S. Shahriar. Superluminal ring laser for hypersensitive sensing. Optics Express., 18:17658, 2010.

D. D. Smith, H. Chang, K Myneni, and A. T. Rosenberger. Fast-light enhancement of an optical cavity by polarization mode coupling. Physical Review A, 89:053804, 2014.

D. D. Smith, K Myneni, J. A. Odutola, and J.-C. Diels. Enhanced sen-sitivity of a passive optical cavity by an intracavity dispersive medium. Physical Review A, 80:011809(R), 2009.

Shecheng Gao, Weigang Zhang, Zhi-Yong Bai, Hao Zhang, Wei Lin, Li Wang, and Jieliang Li. Microfiber-enabled in-line FabryP'erot inter-ferometer for high-sensitive force and refractive index sensing. Journal of lightwave technology, 32:1682-1688, 2014.

R. Gowda, N. Nguyen, J.-C. Diels, R. Norwood, N. Peyghambarian, and K. Kieu. All-fiber bidirectional optical parametric oscillator for precision sensing. Optics Letters, 40:2033-2036, 2015.

Ladan Arissian and Jean-Claude Diels. Repetition rate spectroscopy of the dark line resonance in rubidium. Optics Comm., 264:169-173, 2006.

J. Alnis and M. Auzinsh. Reverse dark resonance in Rb excited by a diode laser. J. Phys. B: At. Mol. Phys., 34:3889-3898, 2001.

J.-C. Diels and Wolfgang Rudolph. Ultrashort laser pulse phenomena. Elsevier, ISBN 0-12-215492-4; second edition, Boston, 2006.

\* cited by examiner

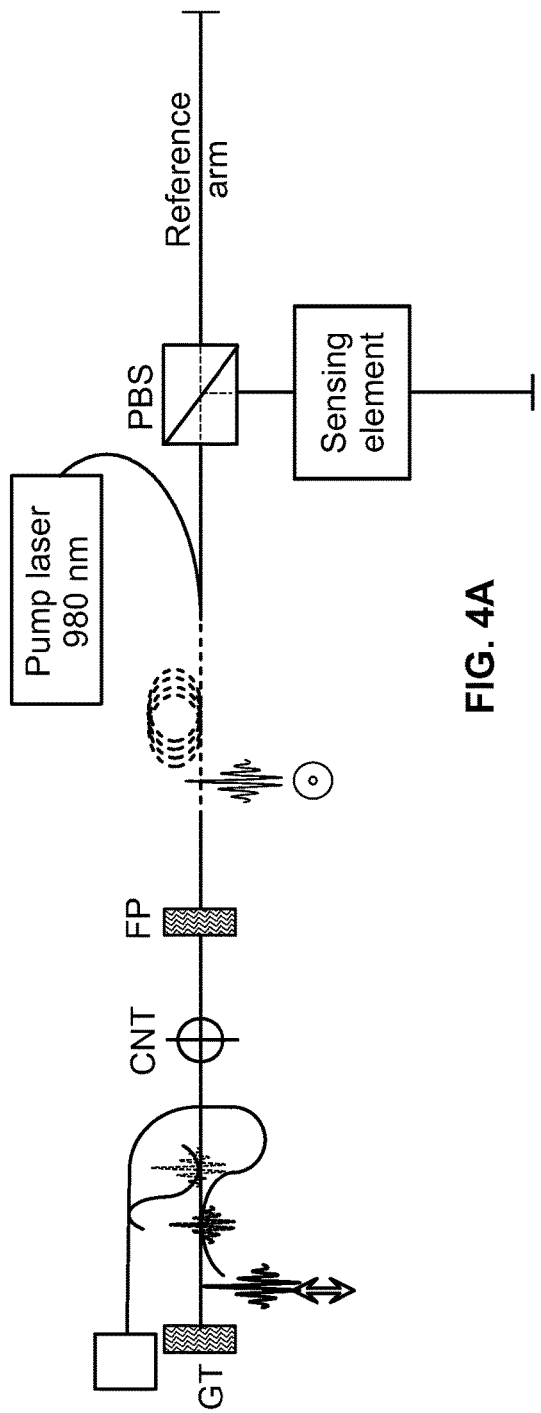
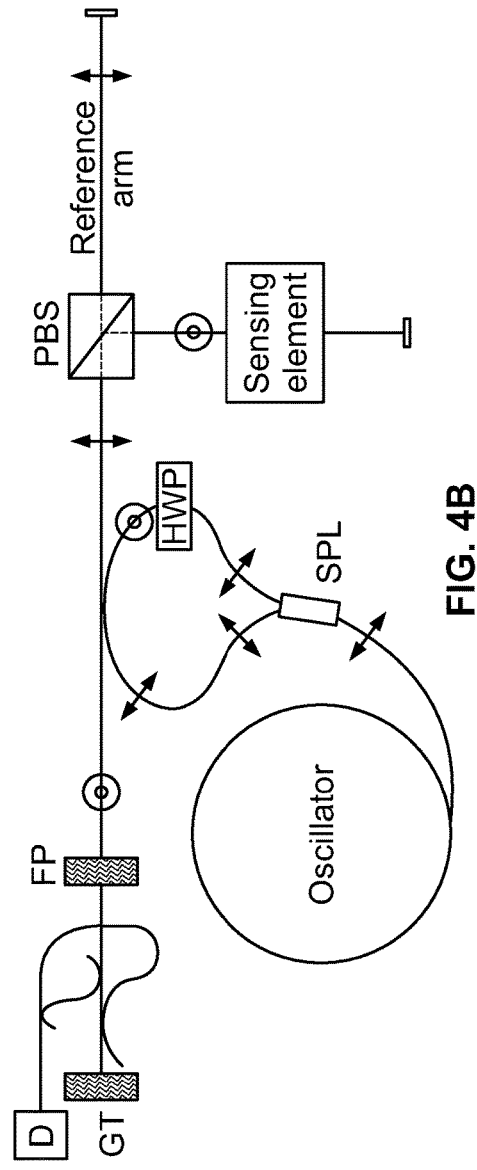
FIG. 4A
FIG. 4B

A: The spectrum of the laser consist in equally spaced spikes (frequency comb)

B: The measurement (Intracavity Phase Interferometry or IPI) splits each spike in 2

C: Each split frequency mode sees a different round-trip time

D: As a result the frequency split increases (this frequency split *is* the measurement))

A: Each tooth of the comb contributes to the Doppler free two-photon absorption

B: The measurement (IPI) splits each tooth in 2

C: Each split tooth sees a different round-trip time

D: As a result the frequency split increases (this frequency split is the measurement)

ENHANCEMENT OF THE PHASE RESPONSE OF INTRACAVITY PHASE INTERFEROMETERS

CROSS-REFERENCE TO RELATED APPLICATIONS

This application claims the benefit of U.S. Provisional Application No. 62/508,648, filed May 19, 2017, which is herein incorporated by reference.

BACKGROUND

A laser gyro is a ring laser in which two beams circulate independently in opposite sense. The gyroscopic response is obtained by beating the two output beams corresponding to the counter-circulating waves on a detector. The rotation produces a Sagnac phase shift per round-trip, which is the beat frequency that is measured. The ring laser can be either continuous wave (cw), which is the case for the conventional He—Ne laser gyro or pulsed. The laser gyro is a particular case of intracavity phase interferometry: in a laser cavity in which 2 pulses circulate, the physical parameter to be measured (rotation for the laser gyro) induces a phase shift $\Delta\phi$ on one of the pulses, which, because of the resonance condition of the laser, is converted into a shift of the optical frequency $\Delta\omega = \Delta\phi/\tau_p$. Here, $\tau_p$ is the cavity round-trip time at the phase velocity, hence the subscript p. In the case of a circular ring laser of radius R rotating at an angular velocity $\Omega_r$ in its plane, the Sagnac phase shift is $\Delta\phi_s/\tau_p = k\Delta P/\tau_p = \omega\Delta P/P$ where P is the cavity perimeter, $\omega$ the (angular) optical frequency, $k=\omega/c$ the wave vector, and $\Delta P = 2R\Omega_r\tau_p$ the effective cavity length difference seen by the counter-circulating waves. In the general case of intracavity phase interferometry, the response is highest for smallest cavity (P small) and short wavelength (large $\omega$). In the particular case of the laser gyro, $\delta P$ is proportional to the square of the perimeter P, hence $$\Delta\omega = \omega\frac{\Delta P}{P} = \frac{4A}{2\pi P\lambda}\Omega_r = R\Omega_r \quad (1)$$

and the response is proportional to the ratio of the area A to the perimeter.

For the last 4 decades, active laser gyros have been limited to He—Ne lasers for the following reasons:

1. Gain competition: It is not possible to have two cw beams circulating in opposite direction in a laser medium that is not inhomogeneously broadened.

2. Injection locking of one beam into the oppositely circulating beam eliminates the gyro response, making a low pressure gas medium preferable Both limitations are eliminated by using mode-locked lasers. If the short pulses circulating in opposite sense in the ring cavity deplete the gain at equal time intervals, there is no gain competition and no limitation to any gain medium. Injection locking by scattering of one beam into the other does not take place if the pulses meet in vacuum (or clean air).

Among all possible solid state lasers, fiber lasers have the advantage to be very light, and can extend over a large area, giving a large sensitivity to the laser gyro [R in Eq. (1)].

The following is background information on slow-light/fast light modification of a gyro response. It has been determined that the dispersion manipulation of passive gyro (e.g. Fiber Optics Gyro or FOG) does not lead to any improvement in performance. For the active laser gyro, however, a steep linear dispersion results in an increase in sensitivity. This enhancement in sensitivity can be at the expense of noise and dead band.

BRIEF DESCRIPTION OF THE FIGURES

Embodiments of the invention are illustrated by way of example and not limitation in the figures of the accompanying drawings in which:

FIG. 4A shows a linear IPI with a PM fiber laser mode-locked by a saturable absorber CNT.

FIG. 4B shows an OPO equivalent.

DESCRIPTION

Figure 1:
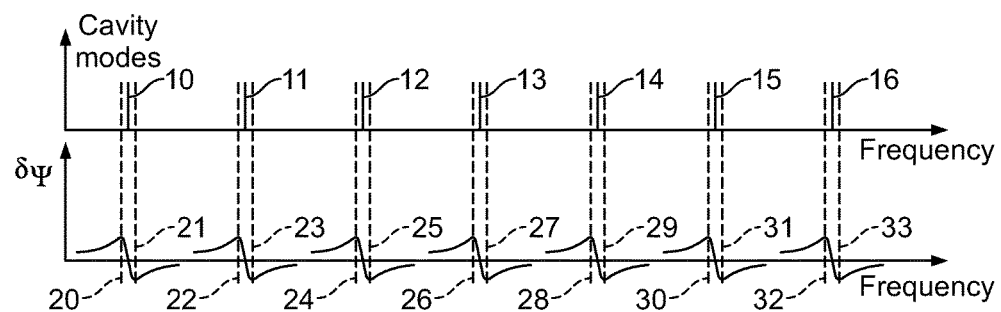
FIG. 1 shows a frequency comb(s) out of a ring mode-locked laser. At rest, the teeth of the two countercirculating combs coincide (vertical red lines). In presence of a relative phase shift/round-trip (Sagnac effect in the case of a laser gyro), the teeth split (dashed lines). According to Eq. (4), this frequency splitting can be modified by the dispersion of a sharp resonance, which should be present at each tooth of the comb at rest.

The following detailed description refers to the accompanying drawings that show, by way of illustration and not limitation, various example embodiments of the invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

A passive resonator gyro is a forced oscillator and can only oscillate at the driving frequency, while the active ring can shift its frequency to follow cavity resonances. In addition, it has been shown that in mode-locked operation, the gyro has no dead band if the pulse crossing point is in a region that does not backscatter (air or ideally vacuum). In addition, in Intracavity Phase Interferometry (IPI) and in particular laser gyros with mode-locked comb, the two output that are made to beat together are correlated, and the noise is subtracted. The bandwidth of a tooth of one of the frequency comb may be several MHz, while the bandwidth of the beat note has been measured below 0.16 Hz, with unstabilized lasers.

In various embodiments, apparatus, systems, and methods taught herein apply to a broad class of sensors, where the laser cavity itself is being exploited as a resonator of extreme finesse of quality factor. It has been shown previously that this technique of IPI already provides ultimate sensitivity in rotation sensing, index of refraction measurement, nonlinear index measurement, very small displacements, acceleration, phonon measurements, metal detection, scatterometry, and magnetic field measurements. The basic method and its fiber implementations have been the subject of a pending patent ["Intracavity fiber sensor" Ladan Arissian and J.-C Diels ( )], which is incorporated herein by reference in its entirety. The present disclosure provides for enhancements of the response of all detection methods cited in:

"Motion induced elimination of dead band in a short pulse laser gyro" (U.S. Pat. No. 5,367,528)

"Resonant cavity dither with index of refraction modulation" (U.S. Pat. No. 5,251,230)

"Sensors of rotation, displacement, index of refraction, magnetic field, electric field and magnetic susceptibility"; bidirectional short pulse ring laser (U.S. Pat. No. 6,650,682)

"Intracavity fiber sensor" J.-C. Diels and Ladan Arissian (U.S. Pat. No. 9,726,472)

"Nested frequency comb" J.-C. Diels and Ladan Arissian (U.S. Pat. No. 9,859,677)

"Multi Comb Generation with Fabry-Perot Etalon in a Mode Locked Laser for Intracavity pulse Shaping and Fine Tuning of Wavelength and Repetition Rate" Ladan Arissian and J.-C. Diels (U.S. Pat. No. 8,929,408).

The realizations of the embodiments taught herein can be applied to extend the various techniques associated with IPI. For example, implementations of the teaching taught herein can be applied to the detection of gravitational waves.

In various embodiments, a dispersive element can be inserted in a laser that couples all modes. Consider phase response in IPI, and the impact of a large dispersion. In the general case of IPI, which involves linear as well as ring mode-locked lasers, a physical quantity to be measured (nonlinear index, magnetic field, stresses, angular velocity, acceleration, electro-optic coefficient, fluid velocity, linear index) creates a differential phase shift $\Delta\phi$ between the two pulses, which, because of the resonance condition of the laser, is translated into a difference in optical frequency. This difference is measured as a beat note produced when interfering the two frequency combs generated by the laser. The measured beat note $\Delta\omega$ can be expressed as:

$$\Delta\omega = \frac{\Delta\phi}{\tau_{ph}} = \omega \frac{\Delta P}{P}. \quad (2)$$

where $\tau_{ph}$ is the round-trip time of the pulse circulating in a laser cavity of perimeter P (in the case of a linear cavity of length L, P=2L and $\Delta P=2\Delta L$), and $\omega$ is the average optical pulse frequency. The technique of IPI has been shown to have extreme sensitivity, with the ability to resolve phase shift differences as small as $\Delta\Phi \approx 0.16 \cdot 10^{-8}$ (corresponding to a beat note bandwidth of 0.16 Hz).

The principle of the "fast light enhancement" of the response of intracavity phase interferometry (and in particular gyro response) is to make $\tau_{ph}$ frequency dependent through an element having a transfer function $\tilde{\tau}(\Omega)=|\tilde{\tau}|\exp[-i\psi(\Omega)]$ with giant $$\frac{d\psi}{d\Omega}$$

$$\tau_{ph} = \tau_{ph0} + \frac{d\psi}{d\Omega}\bigg|_{\omega} \quad (3)$$

where $\tau_{ph0}=(Pn_p)/c$ where $n_p$ is the phase index of refraction at the central carrier frequency $\omega$ averaged over the elements of the cavity. $-\psi(\Omega)$ is the phase of the transfer of the dispersive optical element inserted in the cavity. The beat note is thus:

$$\Delta\omega = \frac{\frac{d\phi}{\tau_{rt0}}}{1 + \frac{1}{\tau_{ph0}}\frac{d\psi}{d\Omega}\bigg|_{\omega}} = \frac{\Delta\omega_0}{1 + \frac{1}{\tau_{ph0}}\frac{d\psi}{d\Omega}\bigg|_{\omega}} \quad (4)$$

It should be noted that all the above considerations pertain to phase resonances and velocities. In the case of normal dispersion, $d\psi/d\Omega|_\omega$ is positive, resulting in a decrease of $\Delta\omega$. There is amplification of the phase response if $d\psi/d\Omega|_\omega$ is negative, a case that is most often quoted as a "fast light" response. If we consider simply propagation through a transparent medium, $\psi=[k(\Omega)-k_0]d$, where $k(\Omega)=\Omega n(\Omega)/c$, is the wavevector of a medium of thickness d and index $n(\Omega)$, and $k_0=k(\Omega)$. We have then for the second term in the denominator of Eq. (4):

$$\frac{1}{\tau_{ph0}}\frac{d\psi}{d\Omega}\bigg|_{\omega} = \frac{1}{\tau_{ph0}}\frac{d}{v_g}. \quad (5)$$

where $v_g$ is the group velocities in a dielectric. Equation (5) deals fundamentally with the phase of the light in a laser cavity, and not the envelope velocity of a circulating pulse. The envelope velocity of a pulse circulating in a mode-locked laser is not related to $d\psi/d\Omega|_\omega$ for a k vector averaged in the cavity, but to the gain and loss dynamics inside the laser. This point is further emphasized by recent measurements showing that the envelope velocity of circulating pulses or bunches of pulses can be varied, while the gyro response remains unchanged. However, it will be shown that the teeth of the frequency comb of mode-laser can be coupled to the modes of an intracavity etalon. It is further demonstrated that a large dispersion results from this coupling, with a magnitude such that $$\left|\frac{1}{\tau_{ph0}}\frac{d\psi}{d\Omega}\bigg|_\omega\right|$$

is of the order of unity.

There is a challenge in achieving large dispersion. In order to achieve the very large dispersion required to modify the phase response through Eq. (4), a very narrow-band resonant structure is required. Narrow bandwidth implies long pulses or cw radiation, where most of the research in this field has focused. For instance, theoretical estimates have found that large $d\psi/d\Omega$ can be produced by a multi-layer coating, by two-peak gain and coupled resonators, or by an atomic medium. The latter property has been verified experimentally. These regions of large dispersion have a small bandwidth. However, a bandwidth value corresponding to the largest beat note to be measured is sufficient. Not so for the mode-locked laser, where the slope of the resonant phase $\psi(\Omega)$ versus frequency has to be seen by every tooth of the comb, as illustrated in FIG. 1. A shown, at rest, the teeth of the two countercirculating combs coincide. In presence of a relative phase shift/round-trip (Sagnac effect in the case of a laser gyro), the teeth split 20-33. According to Eq. (4), this frequency splitting can be modified by the dispersion of a sharp resonance, which should be present at each tooth of the comb at rest.

In a mode-locked laser gyro, as with any implementation of intracavity phase interferometry, the two circulating pulses have to meet at the same point at every round-trip. As the pulses circulating in opposite direction see an optical length differential, decreased or augmented by the giant dispersion, one would expect that the crossing point cannot be maintained if the pulse velocity were simply equal to $1/(dk/d\Omega)$. It has been established however that the average envelope velocity in a mode-locked laser is dominated by gain and losses dynamics of the entire cavity, and that the crossing point of the two pulses can be maintained.

The main challenges are thus to create a structure with giant negative dispersion around each mode, while keeping the modes at resonance with that structure. Several solutions are presented below.

In various embodiments, a solution 1 can include synchronously mode-locked Optical Parametric Oscillator (OPO) with intracavity two photon absorber. Several schemes of synchronously mode-locked OPO for intracavity phase interferometry in general, and laser gyro in particular, have been demonstrated. In these type of devices, a pump laser is injected twice per round-trip time in the main cavity in which the phase measurement is made. The gain is provided by nonlinear parametric amplification. The gain medium can be a nonlinear crystal providing gain at the optical frequency $\omega_s=\omega_p-\omega_i$, where $\omega$ is the frequency of a pump pulse, and $\omega_i$ is an "idler" frequency generated by the process. In fiber implementations, the gain process is four wave mixing in the fiber, with $\omega_s=\omega2_p-\omega_i$. In all cases, the round-trip frequency of the pulse at $\omega_s$ in the OPO cavity has to be exactly equal to the pump pulses repetition rate. This condition that, given the frequency dependence of the signal pulse velocity, sets the exact frequency $\omega_s$. Inserting a vapor in the ring laser with a two photon absorption resonant with the central mode will provide the desired dispersion resonance. The properties that make this absorber to satisfy Eq. (4) with the desired dispersion sign include:

If one mode at $\omega_0$ is resonant with the two-photon resonance at $\omega_{red}=2\omega_0$, the whole comb is resonant since $\omega_0-k\Delta+\omega_0+k\Delta=2\omega_0$, thus satisfying what is shown in FIG. 1

The resonance is very narrow, since the interaction is with counter-propagating beams The dispersion associated with the resonance has the correct sign (negative dispersion) to enhance the phase response of the ring laser.

It should be noted that the resonant two-photon absorber function can also be performed by a second harmonic generating crystal used outside of its exact phase matching bandwidth, inserted in the laser (or OPO) cavity.

Consider implementation. The OPO cavity should be actively stabilized such that one mode of the laser be maintained at resonance with the two-photon transition. It should be noted that it is not necessary to stabilize both the carrier to envelope phase and the repetition rate. Only one parameter is needed—for instance the exact length of the OPO cavity—to bring one mode into resonance. Two techniques can be used to tune the repetition rate:

1. Tune the fiber oscillator perimeter
2. Insert a Fabry-Perot etalon in the oscillator.

Method (1) is state of the art and is typically implemented by coiling a portion of the fiber around a piezoelectric cylinder. The diameter of the cylinder is increased by applying a high voltage between electrodes located on the inner and outer surface of the piezo-cylinder.

Method (2) results from learning that an intracavity etalon is an effective tool to modify the pulse repetition rate in a mode-locked laser. The repetition rate can be tuned either by tuning the angle of incidence on the etalon. or by changing the gain of the laser. The gain dependence exist also without Fabry-Perot, but, being two orders of magnitude smaller, is too small for this application. The Fabry-Perot etalon has to be inserted in an air section of the fiber. If repetition rate tuning is made through gain control, the Fabry-Perot can be integrated in the fiber.

Consider fiber implementation. A fiber optical parametric oscillator ring laser gyro has been demonstrated to have the frequency doubled where there is a need to match an atomic resonance in the visible in the OPO cavity. A ring laser oscillator amplifier is used to pump the OPO ring from two directions via a 50/50 splitter, followed by two unequal arms, and injecting the pump wavelength into the OPO ring via a wavelength division multiplexer (WDM). In this arrangement, as shown in FIG. 2, the signal pulses return through the same WDM towards the detector, through the same unequal arms and recombined at the splitter, ensuring that a temporal overlap is automatically achieved for the two counter-circulating signals.

Figure 2A:
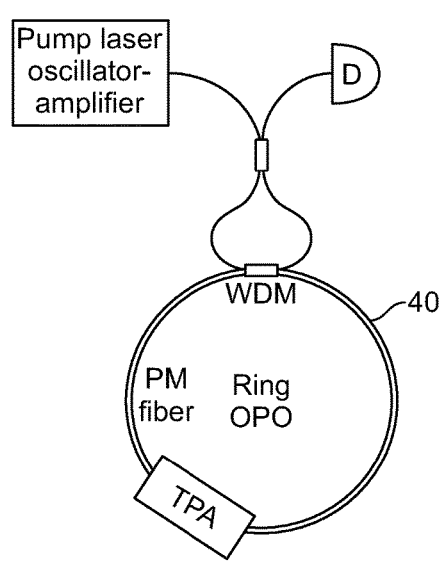
FIG. 2A shows an OPO fiber with an intracavity two-photon absorbing element.

Specifically, FIG. 2A shows an OPO fiber with an intracavity two-photon absorbing element. This element can either be a cell external to the fiber, but preferably a microstructured or capillary fiber in which a two-photon absorbing atomic vapor is inserted. The pump laser consists in a fiber oscillator-amplifier combination, followed by a frequency doubling crystal when an atomic vapor with a resonance in the visible has to be excited.

Figure 2B:
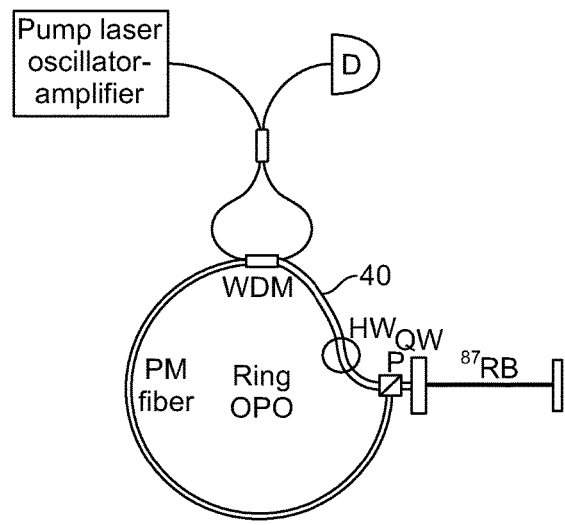
FIG. 2B shows an OPO fiber with an intracavity dark line element.

FIG. 2B shows an OPO fiber with an intracavity 40 (dark line element). Contrary to the case of two-photon resonance, the Doppler-free narrow line resonance can only be obtained in a co-propagating geometry. This is made possible with the geometry shown in the figure, where the dark line resonance is located in a tail of the ring, and the OPO is lasing with polarization orthogonal to the plane of the ring. As in a previous implementation with discrete elements, the counter-clockwise wave (ccw) is reflected into the tail, after a quarter wave element interacts with the atomic vapor as a circularly polarized wave, is reflected back into the polarizer linearly horizontally polarized, to continue, after another 90 p polarization rotation, its ccw trajectory in the ring. The clockwise (cw) pulse follows the same trajectory in reverse but is a circularly polarized pulse of opposite momentum in the tail.

In various embodiments, a solution 2 can include synchronously mode-locked OPO with intracavity reverse dark line resonance. A dark line resonance is a drop of absorption observed in a three level system, where the ground state has a splitting in the radio-frequency range, and an upper level is connected to the ground stated by an absorbing transition. The simplest way to establish the drop in absorption (or establish coherence between the ground states) is to tune the laser repetition rate to the ground-state splitting. The similarity with the two-photon absorption considered above is that it also involves a two photon transition (one photon up, the next one down). Unlike the two-photo absorption, exact resonance with each mode is not required: the resonance is established by the mode spacing. There are two essential challenging differences with the two-photon absorption cases:

(a) The two-photon absorption is Doppler free in counter-propagating geometry. The dark line resonance is Doppler free in co-propagating geometry (b) The dark line resonance being a drop in absorption, the dispersion has the wrong sign for beat note response enhancement.

Challenge (a) can be solved by the arrangement of FIG. 2 (b), attaching a tail to the fiber through an arrangement with polarizing beam splitter, a half wave and a quarter wave plate. Such a ring laser with a tail containing an atomic vapor was demonstrated with a discrete component laser. The technique can easily be applied to the fiber OPO. Challenge (b) has been solved by a reverse dark line resonance (i.e. a narrow enhancement rather than reduction of absorption).

In various embodiments, a solution 3 can include a mode-locked laser with intracavity Fabry-Perot and Gires Tournois. We have discovered that, by inserting a low finesse etalon in a mode-locked cavity, high repetition rate pulse bursts are created, that is passively locked to the comb (modes) of the laser. The low finesse uncoated etalon, when inserted in the mode-locked cavity, acquires a high finesse determined by the laser cavity. The important results pertaining to the teaching herein include:

1. A Gaussian shaped burst is created by the intracavity Fabry-Perot

2. The repetition rate of the burst and that of the laser are locked to each other, indicating that the modes are coupled 3. Because of this coupling, the dispersion of the Fabry-Perot is applied to each mode of the mode-locked laser, and as a result the beat note response is modified by the Fabry-Perot, following Eq. (4).

The transmission function of a Fabry-Perot of thickness d and intensity reflectivity $R=|r|^2$ (where r is the field reflectivity), at an internal angle $\theta$ with the normal, is:

$$\tau(\Omega) = \frac{(1-R)e^{-ikd\cos\theta}}{1-Re^{-2ikd\cos\theta}}. \quad (6)$$

The group delay is the first derivative of the phase $\psi$ of this expression with respect to frequency:

$$\left.\frac{d\psi}{d\Omega}\right|_{\omega_0} = \left(\frac{1+R}{1-R}\right)\frac{1+\tan^2\delta}{\left[1+\left(\frac{1+R}{1-R}\right)^2\tan^2\delta\right]}\frac{nd}{c} \quad (7)$$

where $\delta=kd=\omega nd/c$. This expression being correct near a resonance, we will make the approximation $\tan\delta \approx \delta$. To remain within the bandwidth of the Fabry-Perot transmission, $(1+R)/(1-R)\delta \ll 1$, and:

$$\left.\frac{d\psi}{d\Omega}\right|_{\omega_0} \approx \frac{1+R}{1-R}\frac{nd}{c} \quad (8)$$

It has been demonstrated that the average velocity of the pulse circulating in the mode-locked cavity differs considerably from the group delay of Eq. (7). The group delays are determined by dynamic gain and loss considerations. For instance, the continuum transfer of energy from each pulse of the burst into the next one results in a delay of the center of gravity of that burst. Saturable gain has the opposite effect of accelerating the bursts. The average velocities, as modified by the Fabry-Perot etalon, as function of the tilt of the etalon, have been measured and matched with theoretical simulations.

The Fabry-Perot introduces a reduction instead of an enhancement of the beat note response, since the dispersion added to each tooth of the comb is positive. To achieve the desired response enhancement, the etalon should be used in reflection instead of transmission, but the modes of laser and Fabry-Perot would not couple, because this would correspond to a configuration of maximum losses. The solution is to use a Gires-Tournois interferometer, which has the appropriate dispersion, without the resonant losses that would prevent laser modes and Fabry-Perot modes to coincide.

The Gires-Tournois is essentially an etalon of which one face has 100% reflectivity, and the other face a field reflectivity r. Its transfer function is given by:

$$R = \frac{-r+e^{-i\delta}}{1-re^{-i\delta}} = e^{-i\psi} \quad (9)$$

where $\delta=2kd\cos\theta$ is the phase delay, $\theta$ the internal angle. Near a resonance $\delta=2N\pi$, the phase shift of the device can be approximated by:

$$\psi(\Omega) = -\left[\arctan\left(\frac{1+r}{1-r}\right)\right]\delta \quad (10)$$

Near the resonance, the group delay is approximately:

$$\frac{d\psi}{d\Omega} \approx -\left(\frac{1+r}{1-r}\right)\frac{d\delta}{d\Omega}. \quad (11)$$

which has indeed the correct sign for enhancement of the gyro response.

Insertion of a Fabry-Perot (to lock the modes of the laser cavity) and addition of a Gires Tournois of exactly the same thickness to the cavity will add a negative component to the denominator of Eq. (4). The Fabry-Perot with its resonances will lock the modes of the laser, which are then also locked to those of the Gires-Tournois of the same thickness and material. The condition to make the denominator of Eq. (4) negative (beat note enhancement) is:

$$\frac{1+R}{1-R} < \frac{1+r}{1-r}, \quad (12)$$

where R is the "effective" intensity reflectivity of the Fabry-Perot in the cavity, and r is the reflectivity of the partial reflector of the Gires-Tournois. Value of the reflectivity that will make the denominator of Eq. (4) is r=99% (intensity reflectivity of $r^2$=0.98).

Figure 3A:
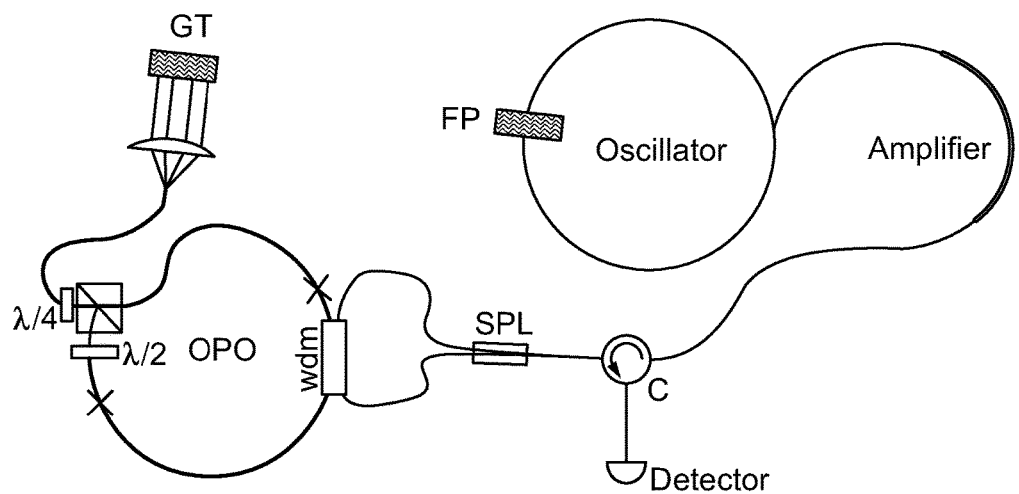
FIG. 3A shows Ring OPO with enhanced sensitivity through a Gires-Tournois interferometer.
Figure 3B:
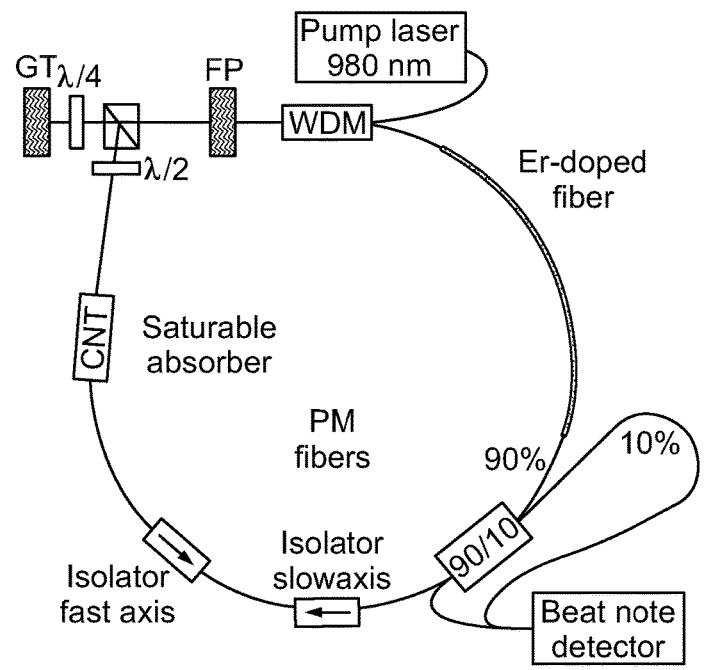
FIG. 3B shows a standard ring oscillator with enhanced sensitivity through a Gires-Tournois interferometer.

Two possible configurations are shown in FIGS. 3A and 3B. FIG. 3A shows a ring OPO with enhanced sensitivity through a Gires-Tournois interferometer. FIG. 3B shows a standard ring oscillator with enhanced sensitivity through a Gires-Tournois interferometer.

Consider a linear laser sensor where Intracavity Phase Interferometry applies ideally to linear cavities. All the considerations above apply also to linear cavity. Two typical linear configurations are shown in FIGS. 4A and 4B. FIG. 4A shows a linear IPI with a PM fiber laser mode-locked by a saturable absorber CNT. For this particular configuration, the enhancement with Gires Tournois is relatively easy, since a Gires-Tournois can be used as end mirror. FIG. 4B shows an OPO equivalent.

The laser may be one of the most sensitive sensors when measurements are performed intracavity as discussed in U.S. Pat. No. 6,650,682 entitled "Sensors of rotation, displacement, index of refraction, magnetic field, electric field and magnetic susceptibility"). In one embodiment, the present invention describes how a mode-locked lasers in which two ultrashort pulses circulate, is used as active differential interferometers. The output of these lasers consists in two pulse trains of exactly the same repetition rate, but with a frequency difference proportional to the parameter being "sensed". This creates a highly sensitive phase sensor because a phase difference between the two intracavity pulses (caused by some external parameter being sensed) is converted directly into a frequency (the "beat frequency" measured by interfering the two pulse trains on a detector).

Figure 5A:
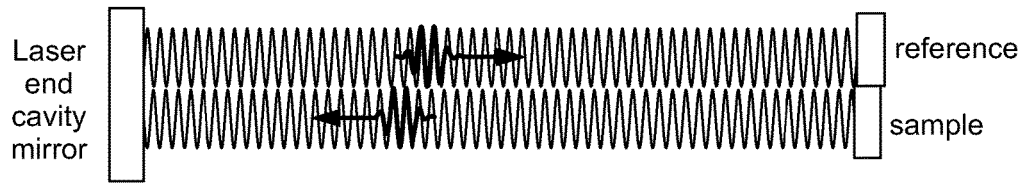
FIG. 5A shows two laser cavities with a sub-micron (sub-wavelength) difference in length.
Figure 5B:
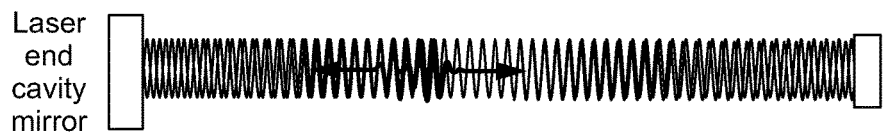
FIG. 5B shows the merger of two laser cavities and how the superimposed standing wave pattern is an accurate measure of the wavelength difference.

FIGS. 5A and 5B illustrate the basic principle of intracavity phase interferometry. In an active laser, the wavelength is an integer fraction of the cavity length (or perimeter for a ring). A minute change in cavity length or perimeter causes a change in wavelength. This applies not only for continuous light, but for pulses circulating in the cavity as shown in FIG. 5A In intracavity phase interferometry, the two pulses circulate in the same cavity as shown in FIG. 5B. The physical parameter to be measured creates a minute difference in optical path for one pulse as compared to the other. The difference in optical frequency is measured directly by interfering the two pulses on a detector. Table 1 shows the dependence of the beat frequency on the change in optical path. The smaller the laser and the shorter the wavelength, the larger the beat frequency.

TABLE 1

| Optical frequency | v |
|---|---|
| Difference in optical path | ΔP |
| Cavity perimeter (ring) | P |
| Cavity length L (linear) | P = 2L |
| Beat frequency (measurement) normalsize | $\Delta v = av\dfrac{\Delta P}{P}$ |

The measurements that can be performed using this technique include rotation, displacement, index of refraction, magnetic field, electric field and magnetic susceptibility as discussed in U.S. Pat. No. 6,650,682. In all these measurements, in contrast with the conventional He—Ne gyroscope, there is no "deadband" if the two pulses do not meet in a scattering medium. Conversely, putting a scattering medium at the pulse crossing point creates a dead band, which leads to an accurate measurement of the scattering of a mirror or a glass as described in U.S. Pat. No. 6,912,051.

In another embodiment, the present invention provides systems and methods for multiplying the beat frequency by factors that can be arbitrarily large. Instead of Table 1, the beat frequency response is now as given in Table 2.

TABLE 2

| Optical frequency | v |
|---|---|
| Difference in optical path | ΔP |
| Cavity perimeter (ring) | P |
| Cavity length L (linear) | P = 2L |
| Beat frequency (measurement) | $\Delta v = av\dfrac{\Delta P}{P}$ |
| Multiplication factor | $a = \dfrac{1}{1 - \dfrac{D}{\tau}}$ |
| Cavity round-trip time | τ |
| Resonant dispersion calculated for each tooth of the laser comb | $D = -\dfrac{d\Phi}{d\Omega}$ |

Figure 6:
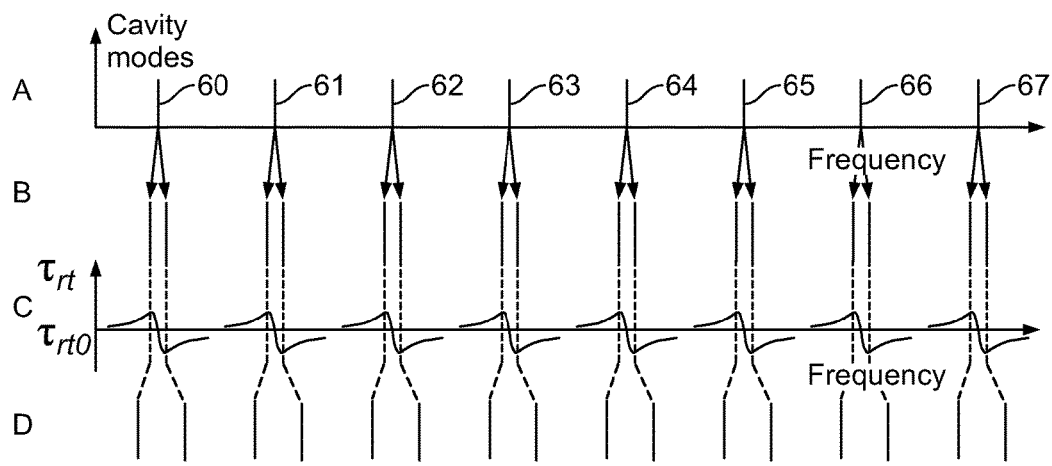
FIG. 6 illustrates basic principles of certain embodiments of the present invention.

FIG. 6 illustrates the enhancement of the beat note, which is the frequency separation of the combs that are split by the measurement. Line A shows that the spectrum of the laser consist in equally spaced spikes 60-67 (frequency comb). Line B shows that the measurement (Intracavity Phase Interferometry or IPI) splits each spike in 2. Line C shows that each split frequency mode sees a different round-trip time. Line D shows that, as a result, the frequency split increases (this frequency split is the measurement).

In one preferred embodiment, the present invention provides various ways to obtain a large multiplication factor a. The multiplication factor a can be obtained with a giant dispersion as in the last line of Table 2, which is the derivative of the phase variation of each frequency component of the laser output. As shown in FIG. 6, the output of the laser consist of two combs in frequency (one corresponding to each pulse circulating in the cavity). In order to have an enhancement of the beat note (or a factor a>>1), a giant dispersion should be applied to each tooth of these combs.

To achieve this enhancement, the present invention provides resonant elements which can couple to the teeth of these combs. In a preferred embodiment, coupling is done with all teeth of the combs. Thus, in one aspect, the present invention provides a system having a laser and a cavity structured to operate with at least two pulses within the cavity. The pulses are shorter in length than the laser cavity. To achieve the enhanced a, one or more resonant elements are disposed in the laser cavity whereby the one or more resonant elements amplify any frequency difference between the at least two pulses.

Figure 7A:
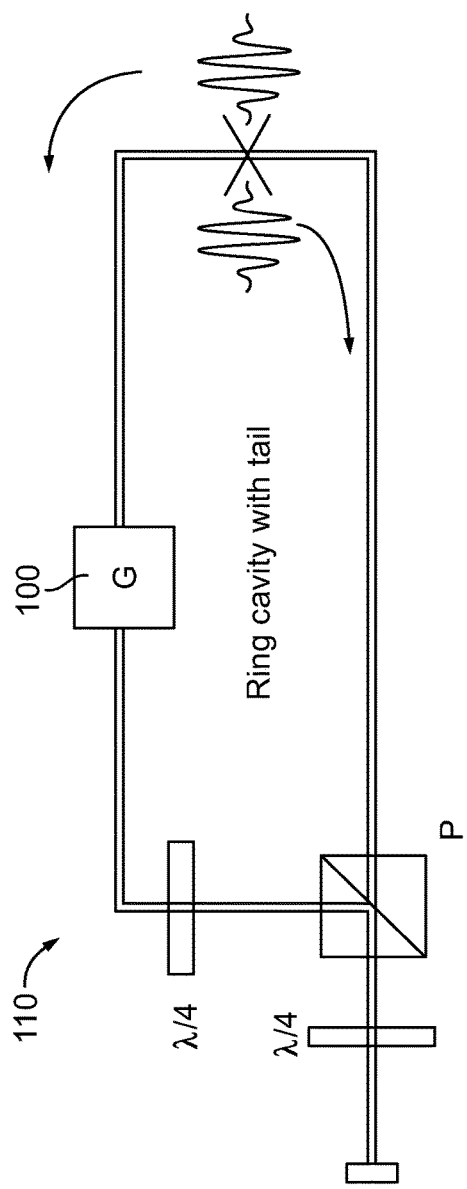
FIG. 7A shows a bidirectional ring cavity (as used for instance in laser gyro or magnetometers).
Figure 7B:
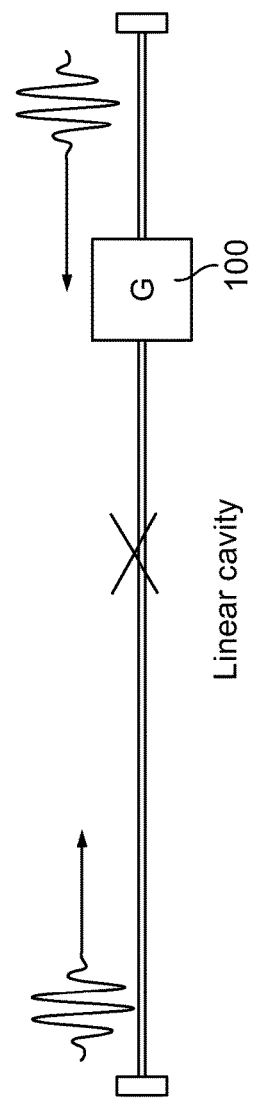
FIG. 7B shows a linear cavity with two pulses per cavity round-trip.

In one embodiment of the present invention, one or more resonant elements 100 may be inserted in the tail of a ring cavity 110 as shown in FIG. 7A, or at one end of a linear cavity as shown in FIG. 7B, in which 2 pulses circulate. Resonant elements 100 may be simple passive structures such as coated glass pieces, atomic vapors, or nonlinear crystals.

Figure 8A:
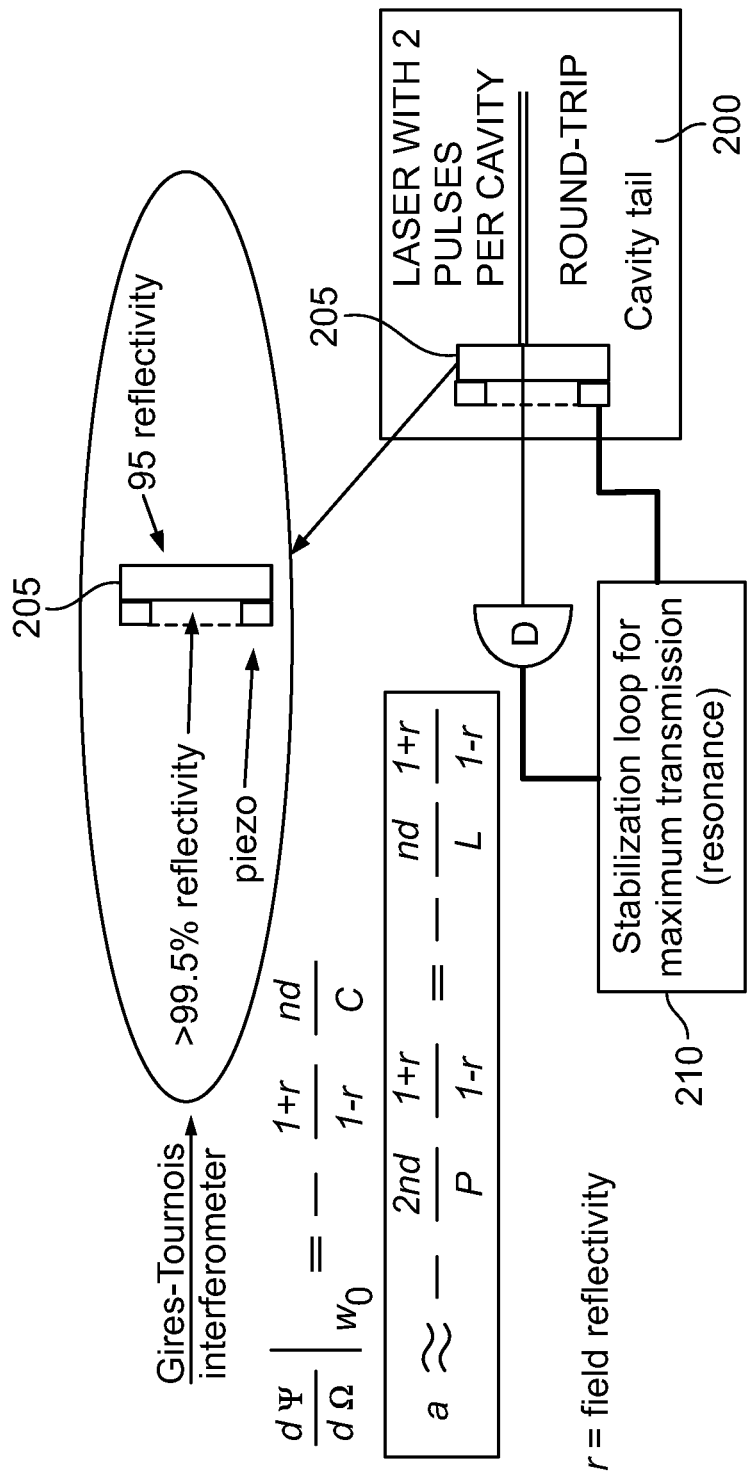
FIG. 8A shows a Gires-Tournois at the end of the cavity for beat note enhancement.

In another embodiment of the present invention, as shown in FIG. 8A, the resonant element located in laser cavity 200 may be a Gires-Tournois 205 which is a parallel faces resonator with a maximum reflectivity at one end, and field reflectivity r at the other end (the intensity reflectivity is R=r²). It is substituted to the mirror at the end of the laser (tail in the case of the ring laser). In other embodiments, the resonant element may be a Gires-Tournois interferometer 200 actively coupled to the laser cavity or electronically coupled to the laser cavity.

As shown in FIG. 8A, it is possible to adjust the laser cavity length L (or perimeter P in the case of the ring laser), the Gires Tournois thickness d, its index n and reflectivity r for near infinite value of a≈1/(1−1). The needed resonance condition between the laser cavity and Gires Tournois can be conserved by a simple feedback loop 210 that maximizes the laser power leaking out of the Gires-Tournois.

Figure 8B:
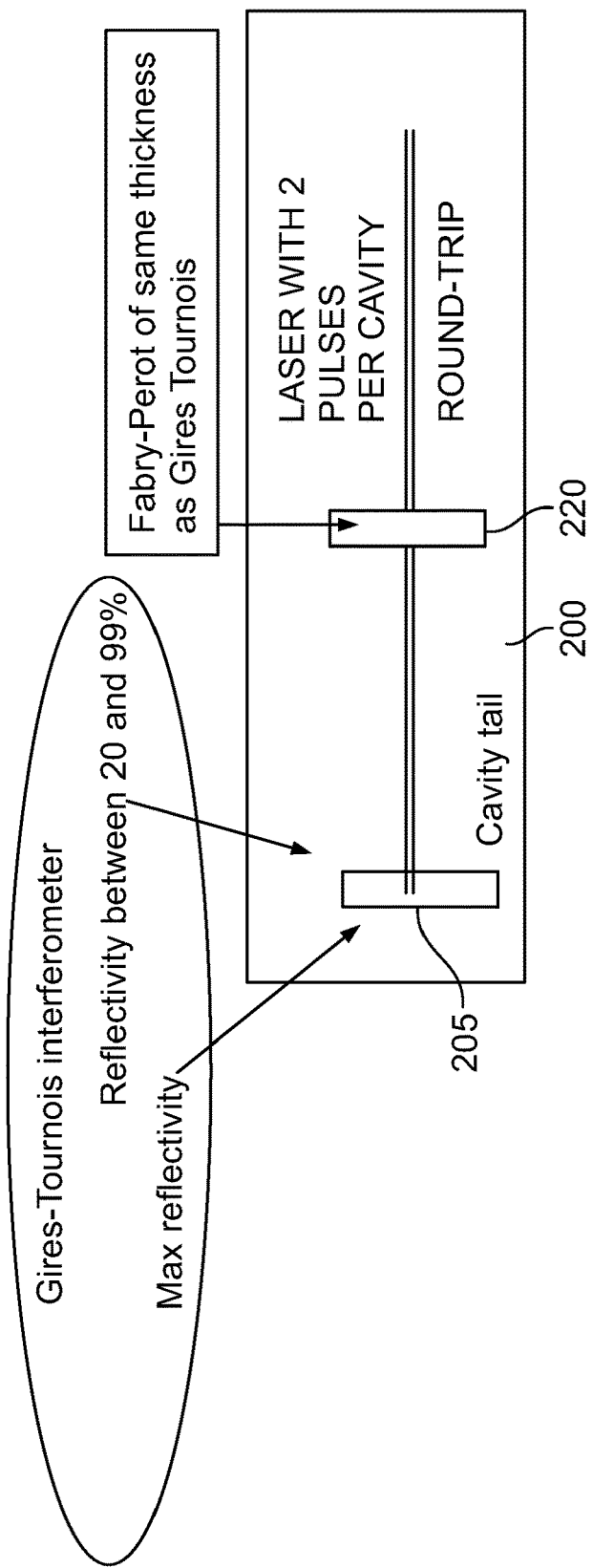
FIG. 8B shows using a Gires-Tournois at the end of the cavity along with a Fabry-Perot for beat note enhancement and laser stabilization.

As shown in FIG. 8B, in another embodiment, the present invention provides as the resonant element a Gires-Tournois resonator 205 coupled to the frequency comb via a Fabry-Perot etalon 220. By inserting Fabry-Perot etalon 220 in the mode-locked laser, it can lock to the modes of the laser, without the need of any active stabilization. Such a simple element can thus replace the electronic stabilization 210 of the system shown in FIG. 8A.

In a preferred embodiment, Fabry-Perot etalon 220 may be configured to have nearly the exact thickness of the Gires-Tournois 205. Also, the enhancement from the Gires-Tournois is reduced by a reduction of beat note due to the Fabry-Perot.

Figure 9:
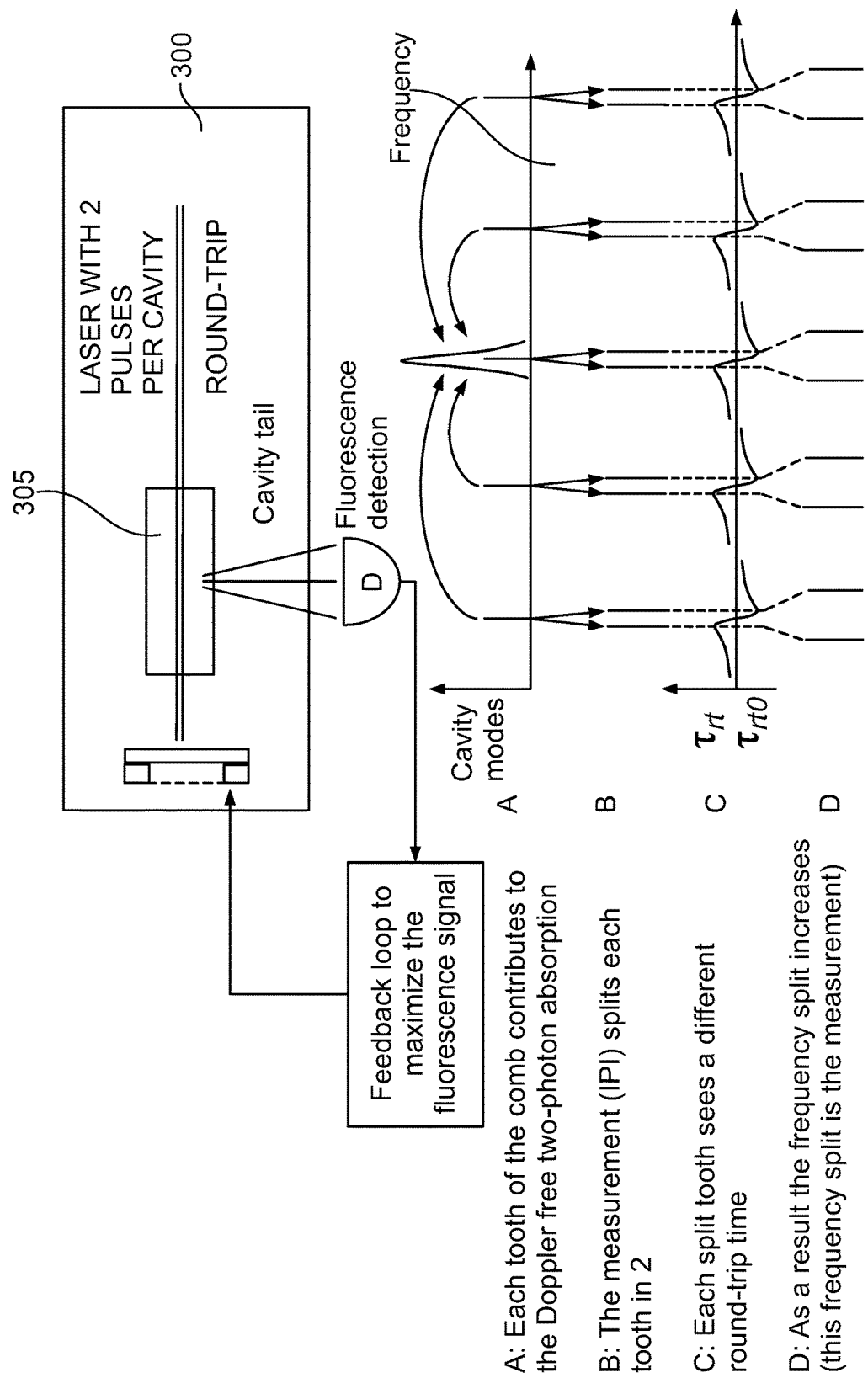
FIG. 9 shows using atomic vapor in two photon absorption for beat note enhancement.

In another embodiment of the present invention, as shown in FIG. 9, the resonant element located in laser cavity 300 may be a resonant absorber such as an atomic vapor cell 305. An atomic vapor can have extremely sharp resonances that are associated with the needed giant dispersion. An example is a two photon resonance, which is extremely narrow if using counter-propagating pulses (elimination of Doppler broadening). If one tooth of the comb in resonant with the two photon transition, the teeth of the comb symmetrically positioned with respect to the tooth add to the same frequency and are thus also resonant as shown in FIG. 9. Stabilization of one tooth of the comb onto the two-photon transition is made by maximizing the fluorescence of the cell.

Figure 10:
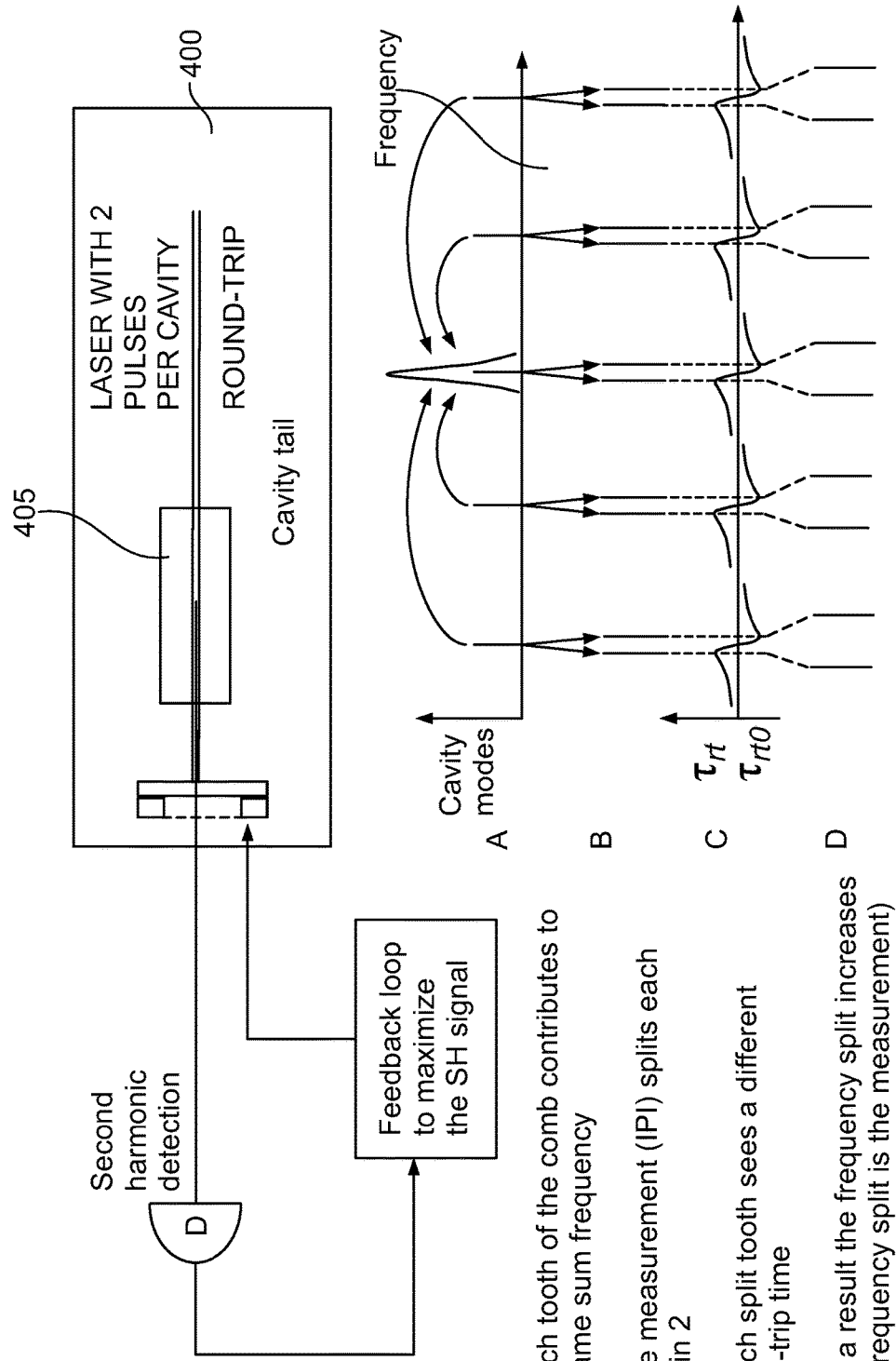
FIG. 10 shows using nonlinear crystal for beat note enhancement

In another embodiment of the present invention, as shown in FIG. 10, the resonant element located in laser cavity 400 may be a resonant nonlinear crystal 405. A long second harmonic generating crystal has the same properties as the two-photon resonant atomic vapor. Stabilization of one tooth of the comb onto the phase matching wavelength of the crystal may be made by maximizing the second harmonic generated as shown in FIG. 10.

The resonant element may also be a crystal phase matched to generate the second harmonic of all pulses. The bandwidth of the crystal may also be narrower than the spacing between modes.

Figure 11:
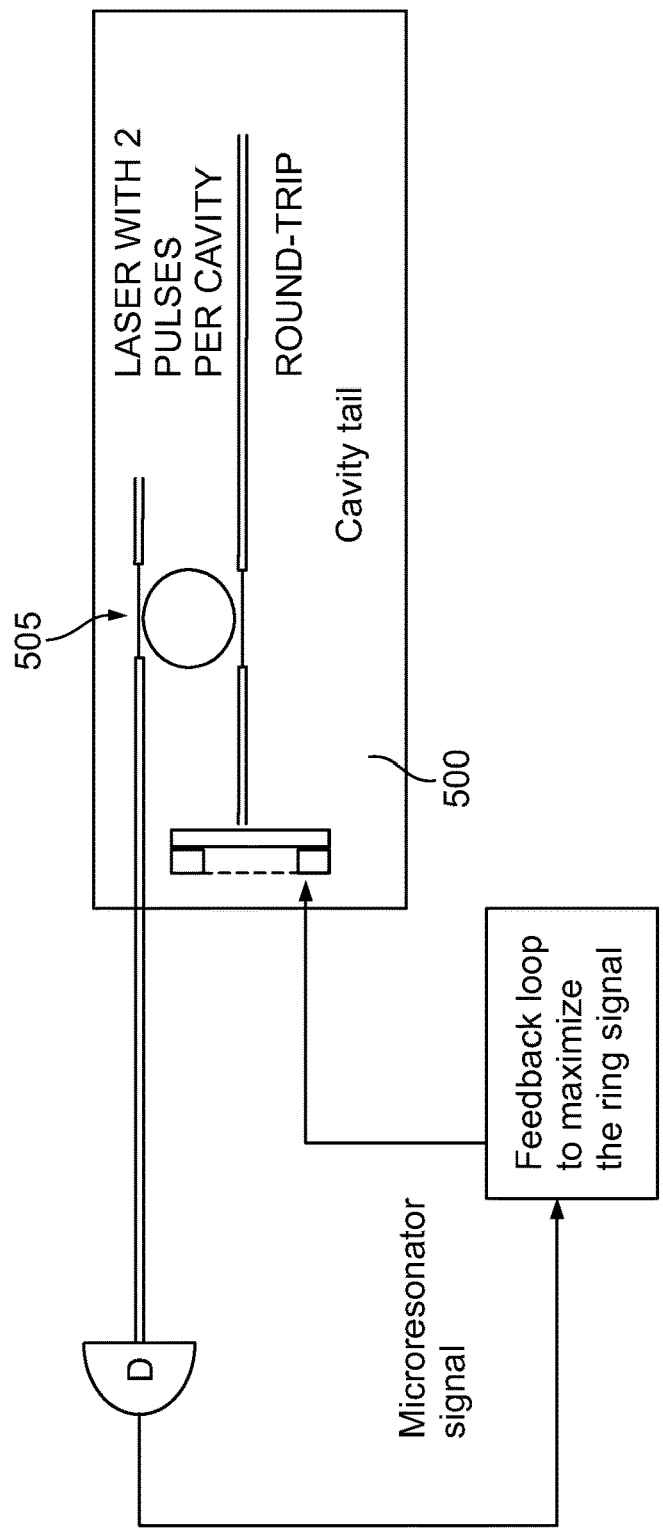
FIG. 11 using a sphere or micro-ring for beat note enhancement.

In another embodiment of the present invention, as shown in FIG. 11, the resonant element located in laser cavity 500 may be a sphere or microring resonator 505. Sphere or microring resonator 505 is coupled to said laser by an evanescent wave.

There are a number of applications in which the above described embodiments of the present invention may be used. For example, the above described embodiments may be used as a laser gyro systems that measures rotation. Other applications include systems that makes FIG. 8 rings to eliminate a rotation measurement or measure magnetic fields. In other applications, the embodiments of the present invention may be used in systems that include at least one linear cavity to measure acceleration, elongation, temperature, gas pressure or air pressure.

Although specific embodiments have been illustrated and described herein, it will be appreciated by those of ordinary skill in the art that any arrangement that is calculated to achieve the same purpose may be substituted for the specific embodiments shown. Upon studying the disclosure, it will be apparent to those skilled in the art that various modifications and variations can be made in the devices and methods of various embodiments of the invention. Various embodiments can use permutations and/or combinations of embodiments described herein. Other embodiments will be apparent to those skilled in the art from consideration of the specification and practice of the embodiments disclosed herein. It is to be understood that the above description is intended to be illustrative, and not restrictive, and that the phraseology or terminology employed herein is for the purpose of description.

What is claimed is:

1. A system comprising:
   a laser having a cavity structured to operate with at least two pulses within its cavity, said pulses shorter in length that said laser cavity; and
   a resonant element disposed in said laser cavity, said resonant element amplifies any frequency difference between said at least two pulses.

2. The system of claim 1 wherein said resonant element is a Gires-Tournois interferometer actively coupled to the laser cavity.

3. The system of claim 1 wherein said resonant element is an atomic vapor cell.

4. The system of claim 3 wherein said atomic vapor cell has vapor at two-photon resonance with said laser.

5. The system of claim 1 wherein said resonant element is a crystal phase matched to generate the second harmonic of all pulses.

6. The system of claim 5 wherein the bandwidth of the crystal is narrower than the spacing between modes.

7. The system of claim 1 wherein said resonant element is a sphere coupled to said laser by an evanescent wave.

8. The system of claim 1 wherein said resonant element is a microring resonator coupled to said laser by an evanescent wave.

9. The system of claim 1 wherein said resonant element is a Gires-Tournois interferometer and the coupling between the Gires-Tournois and the laser cavity is achieved by a Fabry-Perot etalon.

10. The system of claim 1 wherein said resonant element is a Gires-Tournois interferometer electronically coupled to the laser cavity.

11. The system of claim 3 wherein said atomic vapor cell has vapor at two-photon resonance with said laser located at the crossing point of two intracavity pulses.

12. A system comprising:
    a laser having a cavity structured to operate with at least two pulses within its cavity, said pulses shorter in length that said laser cavity;
    a resonant element disposed in said laser cavity, said resonant element amplifies any frequency difference between said at least two pulses; and
    said resonant element is one of the following: Gires-Tournois interferometer actively coupled to the laser cavity; an atomic vapor cell; a crystal phase matched to generate the second harmonic of all pulses; a sphere coupled to said laser by an evanescent wave; a microring resonator coupled to said laser by an evanescent wave; or a Gires-Tournois interferometer and the coupling between the Gires-Tournois and the laser cavity is achieved by a Fabry-Perot etalon.

13. The system of claim 12 wherein said system is laser gyro that measures rotation.

14. The system of claim 12 wherein said system makes FIG. 8 rings to eliminate a rotation measurement.

15. The system of claim 12 wherein said system measures magnetic fields.

16. The system of claim 12 wherein said system includes at least one linear cavity to measure acceleration.

17. The system of claim 12 wherein said system includes at least one linear cavity to measure elongation.

18. The system of claim 12 wherein said system includes at least one linear cavity to measure temperature.

19. The system of claim 12 wherein said system includes at least one linear cavity to measure pressure of a gas.

* * * * *